(12) United States Patent
Freedman et al.

(10) Patent No.: US 7,580,920 B2
(45) Date of Patent: Aug. 25, 2009

(54) SYSTEM AND METHOD FOR GRACEFUL DEGRADATION OF A DATABASE QUERY

(75) Inventors: Craig S. Freedman, Sammamish, WA (US); Goetz Graefe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 10/897,017

(22) Filed: Jul. 22, 2004

(65) Prior Publication Data

US 2006/0020579 A1 Jan. 26, 2006

(51) Int. Cl.
*G06F 7/00* (2006.01)
(52) U.S. Cl. .................. 707/3; 707/2; 707/5
(58) Field of Classification Search .......... 707/3, 707/2, 5
See application file for complete search history.

(56) References Cited

U.S. PATENT DOCUMENTS

| 6,424,967 | B1* | 7/2002 | Johnson et al. | 707/3 |
| 6,907,422 | B1* | 6/2005 | Predovic | 707/2 |
| 7,010,516 | B2* | 3/2006 | Leslie | 707/2 |
| 7,171,408 | B2* | 1/2007 | Zuzarte | 707/5 |
| 2004/0010488 | A1* | 1/2004 | Chaudhuri et al. | 707/3 |
| 2005/0097078 | A1* | 5/2005 | Lohman et al. | 707/2 |
| 2005/0267866 | A1* | 12/2005 | Markl et al. | 707/2 |

OTHER PUBLICATIONS

V. Raman, B. Raman, and J. M. Hellerstein, "Online dynamic reordering", The VLDB Journal, Jun. 23, 2000 pp. 247-260.*

Arge, L. et al., "Theory and Practice of I/O-Efficient Algorithms for Multidimensional Batched Searching Problems", *Symposium on Discrete Algorithms, Proceedings of the Ninth Annual ACM-SIAM Symposium on Discrete Algorithms*, 1998, 685-694.

Bruno, N. et al., "Exploiting Statistics on Query Expressions for Optimization", *International Conference on Management of Data, Proceedings of the 2002 ACM SIGMOD International Conference on Management of Data*, 2002, 263-274.

Cole, R.L. et al., "Optimization of Dynamic Query Evaluation Plans", *International Conference on Management of Data, Proceedings of the 1994 ACM SIGMOD International Conference on Management of Data*, 1994, 150-160.

(Continued)

*Primary Examiner*—Hosain T Alam
*Assistant Examiner*—Jieying Tang
(74) *Attorney, Agent, or Firm*—Woodcock Washburn LLP (57) ABSTRACT

A method to achieve acceptable query performance even when a database query optimizer chooses an inefficient query plan due to poor cardinality (row count) estimation includes generating a batch sort query plan which includes a row count operation and a reorder operation. The batch sort, and in particular the reorder operation, is not required to satisfy the query but without these operations the query plan may prove to be inefficient. When the row count operation determines that the query plan is inefficient, the row reordering operation reorders rows for more I/O efficient processing. The results of both the row count operation and the reorder operation are used to produce the desired rowset to satisfy the input query without discarding any retrieved rows. The combination of the row count operation and reorder operation allows a graceful degradation of query performance where the original query plan selected by a query optimizer without the batch sort or reorder operation would execute in an I/O inefficient manner.

28 Claims, 4 Drawing Sheets

OTHER PUBLICATIONS

Graefe, G. et al., "Dynamic Query Evaluation Plans", *International Conference on Management of Data, Proceedings of the 1989 ACM SIGMOD International Conference on Management of Data*, 1989, 358-366.

Graefe, G., "Query Evaluation Techniques for Large Databases", Based on a survey with the same title published in *ACM Computing Surveys*, Jun. 1993, 73-170.

Hsu, C-N. et al., "Reformulating Query Plans for Multidatabase Systems", *Conference on Information and Knowledge Management, Proceedings of the 2nd International Conference on Information and Knowledge Management*, 1993, 423-432.

Ioannidis, Y.E. et al., "On the Propagation of Errors in the Size of Join Results", *International Conference on Management of Data, Proceedings of the 1991 ACM SIGMOD International Conference on Management of Data*, 1991, 268-277.

Kabra, N. et al., "Efficient Mid-Query Re-Optimization of Sub-Optimal Query Execution Plans", *international Conference on Management of Data, Proceedings of the 1998, ACM SIGMOD International Conference on Management of Data*, 1998, 106-117.

Reiss, F.R. et al., "A Characterization of the Sensitivity of Query Optimization to Storage Access Cost", *International Conference on Management of Data, Proceedings of the 2003 ACM SIGMOD International Conference on Management of Data*, 2003, 385-396.

\* cited by examiner

SYSTEM AND METHOD FOR GRACEFUL DEGRADATION OF A DATABASE QUERY

FIELD OF THE INVENTION

This invention relates in general to the field of database queries. More particularly, this invention relates to performing an I/O efficient query of a database.

BACKGROUND OF THE INVENTION

The structured query language (SQL) is a non-procedural program language. Although it supports the query of databases via database management systems, it does not specifically delineate how to search for data. The SQL language implies the existence of a query optimizer to find the desired data in a database query task. Generally, query optimizers are machines that input a query and produce a good plan choice for execution of a search of the database. Optimizers may make choices based on statistics on the information within the database, query predicate selectivity, and cardinality estimates (intermediate result sizes). Query plans are then generated and subsequently executed.

The cost of performing a query may be measured in I/O accesses. The greater the number of I/O accesses, the less efficient the performance of a query. Moreover, random I/O accesses are less efficient than sequential I/O accesses. An efficient query plan will obtain the desired data with as few I/O accesses as possible and, whenever possible, will minimize the use of random I/O accesses in favor of sequential I/O accesses. Inefficient query performance may be the result of a bad choice made by the optimizer in constructing a query plan. A poor performance choice in a query plan may be made based on inaccurate cardinality estimates. Cardinality estimates are derived from statistics concerning the information in the database and are affected both by inaccurate statistics and by excessively complex predicates. That is, even with perfectly accurate statistics, some predicates are too complex to allow for accurate estimates.

It has been observed that one possible improvement to the specific problem of querying a database is to consider performing a sort for greater fetch efficiency. In fact, sorts are known to be of help in the cases of fetch, index nested loop join, insert, update, and delete. Presently, once a query plan has been chosen based on the best available statistics concerning the database, there is little opportunity to change the progress of a plan while it is being executed. There is currently no method of recovering from a poor performance plan without stopping the execution of the original plan, discarding any existing results, reformulating the plan, executing the reformulated plan and retrieving new results in a manner that utilizes past results.

Thus, there is a need for a technique to adaptively change a query plan during execution without losing row data already retrieved. The present invention addresses the aforementioned needs and solves them with additional advantages as expressed herein.

SUMMARY OF THE INVENTION

An embodiment of the invention provides a method to achieve acceptable query performance even when an optimizer engine chooses a poor efficiency query plan due to inaccurate cardinality estimation. The method prevents a serious degradation of query execution efficiency and introduces a more graceful manner of degradation using a batch sort query plan. The batch sort is a robust and adaptive solution that reduces the worst case performance of some joins by multiple orders of magnitude with little or no negative impact if a query optimizer selects a plan based on inaccurate cardinality estimates.

An embodiment of one method employing aspects of the invention includes the generation of a batch sort query plan which can execute a target operation, such as, for example, a fetch, index nested loop join, insert, update, or delete operation iteratively until the actual number of retrieved rows for a query exceeds the number of estimated rows. The excess return rows may be a simple overage or it may be an overage applied by a numeric factor, such as a positive real number. In any event, once a threshold of excess rows is reached, the target operation is considered inefficient and the batch sort query plan begins to execute a reordering operation to improve performance of the query. The reordering assists in the efficient return of relevant rows corresponding to the query statement.

Another aspect of the invention includes seamlessly enabling the reordering operation such that no row retrieval is lost, discarded, or repeated in producing a query output rowset that satisfies the input query.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

Figure 1:
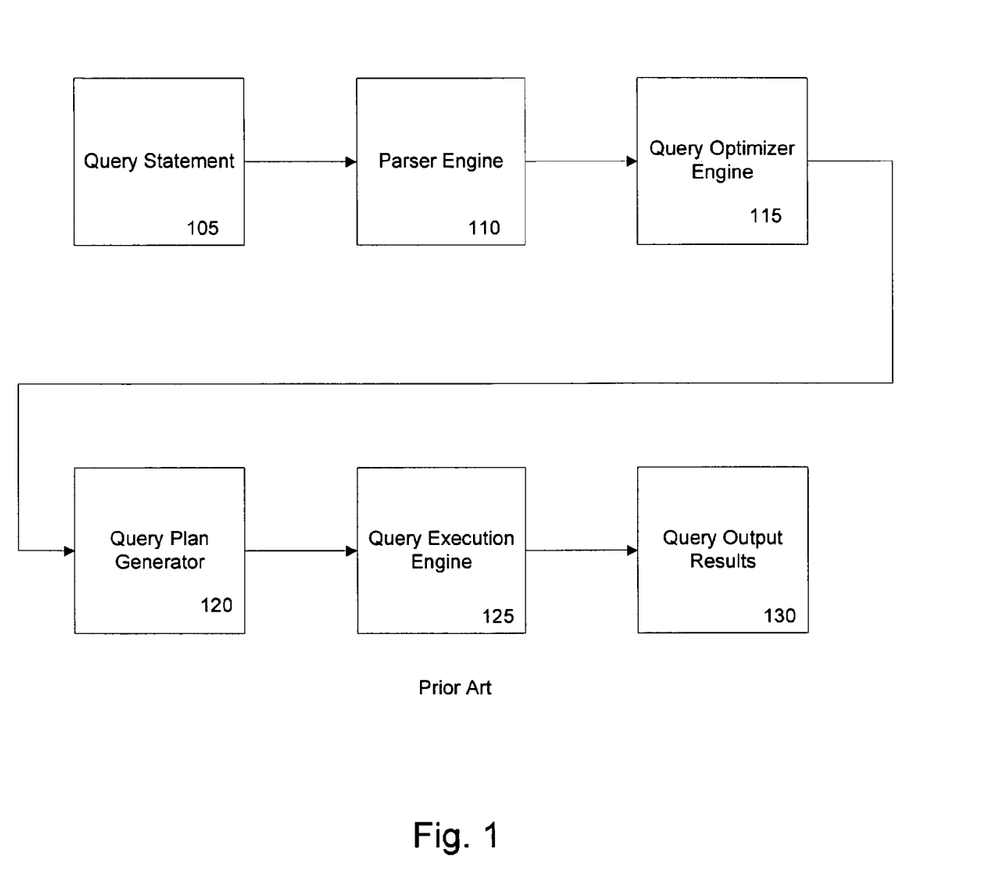
FIG. 1 is a flow diagram of a prior art query system.

FIG. 1 is a flow diagram of a technique 100 commonly used to query a database. Initially, a query statement 105 is input which contains instructions in a query language to obtain data from a database. The query language could be any language supported by the database management system supporting the database. For example, the query language could be SQL for a structured query language based database management system. The query statement 105 is input into a parser engine 110 which is a software routine that analyzes the query text statement input and breaks it into its constituent parts. Once broken down, the query request may be entered into a query optimizer engine 115.

Query optimizers are devices that analyze a request for query, determine a plan to extract the sought-after data from the database, and construct the plan. A query optimizer may use database statistics, such as statistics on tables and indexes, to construct a database query plan that is input/output (I/O) efficient. I/O efficiency is desirable because query results can be more quickly obtained if they are obtained using a plan that requires the fewest I/O accesses and that favors sequential I/O accesses over random I/O accesses. Generally, an optimizer that utilizes database statistics can generate an estimate of the number of rows in the database that may be retrieved in order to satisfy the query.

In some optimizers, multiple query options may be formulated and compared against each other to determine the most I/O efficient plan. Once a choice of the most efficient set of options is made, the query plan generator 120 generates a method or plan for realizing query activities. The query plan is then input into a query plan execution engine 125 and row results are produced which are indicative of the results desired by the original query statement 105. Row results 130 may be made available to a user.

This prior art flow diagram process 100 generally requires the query execution engine 125 to fully execute the query plan before the results are analyzed to determine if the query plan is actually I/O efficient. One prior art method, called "choose plan" is an operator that can be inserted into a query plan to provide a hard choice between two alternative, equivalent query plans. The choice of the two alternate plans is not possible based on information available at compile time but is available when query execution actually commences.

A better approach is to generate only one query plan instead of multiple plans, yet monitor the expected performance of the plan during execution. This approach could adapt to the data distribution as data items are processed, and would not be switching to an alternative plan, but would include optional operations in the running query execution plan itself. If the executing plan indicates that the performance may be degrading as compared to a performance estimate, then alternate execution steps, which pick up where the first query approach left off, may be implemented. Using this technique, the benefit of using the results already obtained may be gathered while an efficiency in query execution is realized. The result may be a graceful degradation of performance instead of a significant degradation of performance.

Thus, a method to achieve acceptable query performance even when a query optimizer chooses a bad query plan due to poor cardinality estimation may be achieved. In one embodiment, the method may use a scheme that changes execution steps based on monitoring of a performance standard. The method has advantages in that a more efficient process may begin without the time and disk I/O overhead of stopping one process and beginning another process. In addition, the overall method need lose none of its previous results in order to complete the query and return a result set that satisfies the original query.

Figure 2:
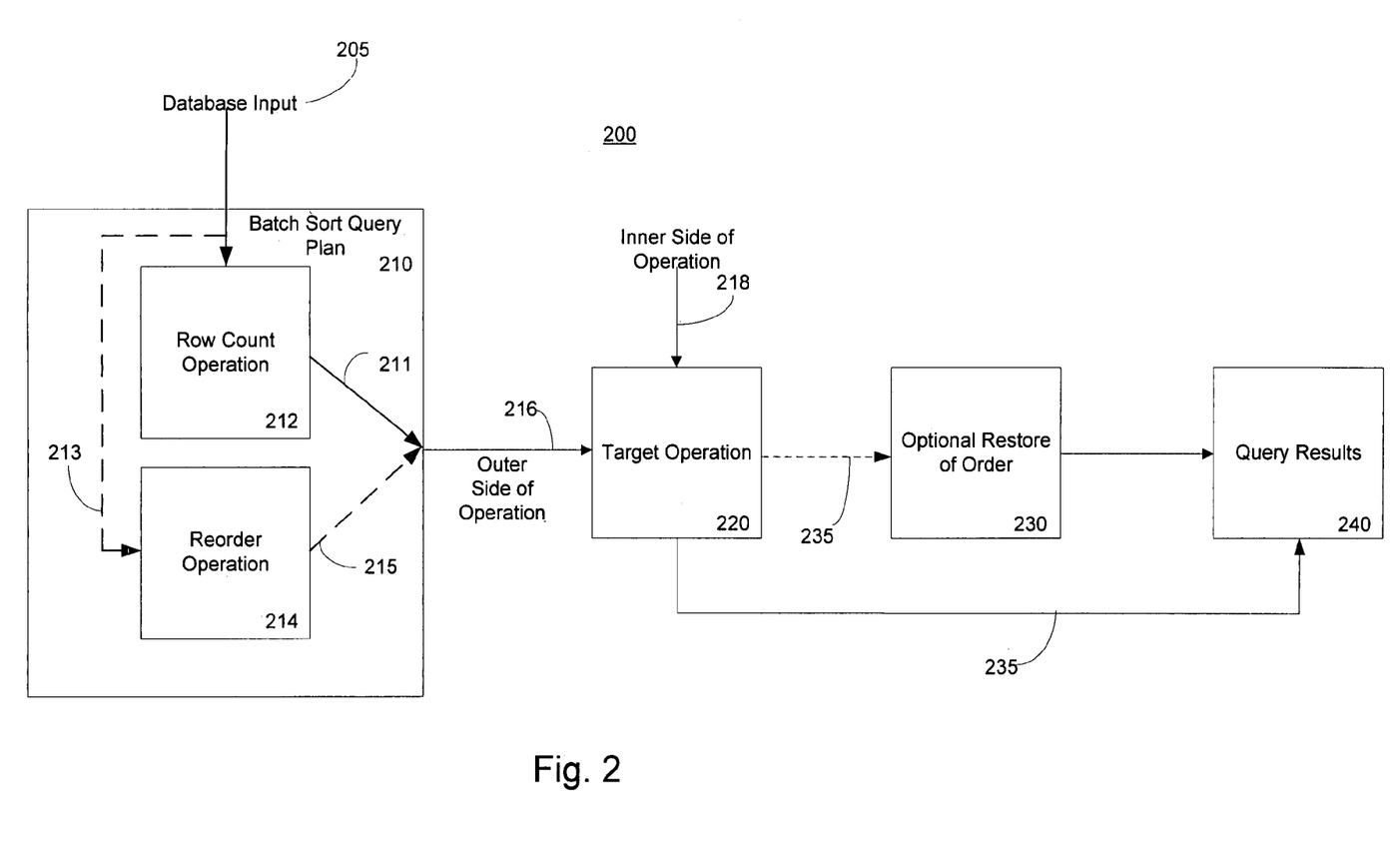
FIG. 2 is an exemplary flow diagram showing the batch sort query plan aspect of the invention.

FIG. 2 is a block diagram of an embodiment of aspects of the invention. FIG. 2 depicts aspects of a flow diagram 200, that inputs relational or non-relational database information 205 to be acted upon by a single query plan which consists of a batch sort operation 210, a target operation 220, and an optional restore of order operation 230. The database information 205 can be input from database tables or from the prior step of a query execution plan including input from an intermediate work table, spool file, or pipelined results from another operator or step. The batch sort operation 210 and has at least two features: a row count operation 212 and a reorder operation 214. The combination of these two features in a query plan is termed a batch sort for purposes of this invention. The row count operation 212 passes rows directly to the target operation 220 in the original order and it serves to count retrieved input rows and compare the result against the expected cardinality.

In general, batch sort can be added to certain target operations, such as, for example, fetch, index nested loop join, insert, update, or delete operations. A fetch operation inputs pointers or bookmarks generated by seeking into or scanning a non-clustered or secondary index and looks up the row in the clustered index or base table. A batch sort yields much of the same performance benefits of a regular reorder or regular sort but can be applied much more generally and without the same risk of harming performance. Specifically, a regular sort consumes its entire input before producing a single row. This is needed since the last input row may be the first output row after the sort completes. A batch sort begins returning results before consuming all input rows. In the event that a small subset of the input rows suffice to complete the query execution, a regular sort will delay the completion of the query by consuming all input rows while a batch sort will not.

The batch sort presumes that optimizer engine estimates are accurate and bases its initial behavior on these estimates. It has two modes of operation: row count and reorder which correspond respectively with the row count operation 212 and reorder operation 214 from FIG. 2. If an optimizer engine expects to process relatively few rows, the batch sort query plan begins by entering the row count mode. In this mode, the batch sort operation returns rows directly without performing any reordering operation such as sorting. This startup behavior is desirable if the original query plan or query step includes an operation such as top N, fast N hint, or a semi-join that introduces a row goal. In this case, it is preferable to terminate the query plan as quickly as possible if the row goal can be met early during execution. Once the batch sort reaches the threshold for the maximum number of rows to process in row count mode, if more rows need to be processed, it switches to reorder mode. In this mode, the batch sort consumes, reorders, and returns a subset of its remaining input rows. If more rows are needed after the batch sort returns the first reordered batch, it consumes and reorders another batch. As long as more rows need to be processed, the batch sort continues to reorder additional batches. Although it is not a requirement, commonly each subsequent batch will be larger than the prior batch although this is not a requirement. Thus, as the optimizer engine's original cardinality estimate is proven more and more inaccurate, the batch sort approaches the behavior of a full reordering. The only limitation on batch size is available memory. The batch sort preferably only performs in-memory reordering and avoids disk-based reorder operations to avoid excessive I/O operations.

The batch sort can be used to improve the performance of target operations which include index nested loop joins using non-clustered or clustered indexes, bookmark lookups against a clustered index or heap, and inserts to, updates of, and deletes from of a non-clustered index, clustered index, or heap. It can also be used to improve performance by reducing the number of partition switches when joining, inserting, deleting or updating a partitioned table.

Returning to FIG. 2, the row count operation 212, within the batch sort, passes suitable rows via paths 211 and 216 to a target operation 220. As part of the query plan execution, if the actual number of rows processed exceeds the threshold set for the row count operation 212, the database information input 205 may be redirected, via optional path 213 (shown dotted), to a reorder operation 214.

The reorder operation 214, within the batch sort query plan, is inserted to selectively reorder (e.g. pre-sort) relevant row batches of the database information 205. This reordering may be performed on the fly, that is, without interrupting the execution of the batch sort query plan 210. The reordering is expected to enhance the efficiency of the overall query by reducing random I/O accesses, replacing them with sequential I/O accesses, such as sequential disk accesses, that result from the execution of the query. Such re-ordering may take into account such effects as multiple row retrievals from a single page of disk. In this example, if a single page on disk contains two or more rows of interest to the query, it would be I/O efficient to access the disk page only once and extract the two or more relevant rows during a single access. This action may require a pre-sorting to ensure that the disk page is accessed only once and not two or more times. This pre-sorting example provides for a higher I/O efficiency.

Once a reorder operation 214 has been performed, the pre-processed rows may be submitted to the target operation 220 via optional path 215 (shown dotted) and path 216. In one specific embodiment, if the target operation is an index nested loop join function, then the rows being passed or processed through execution of the query plan 210 and being provided via output path 216 may be said to be the data applied to the outer side of the target operation 220. In the same embodiment, if the target operation is a loop join, then the outer side retrieved rows may be applied to the inner side of the target function via path 218. An algorithm describing the relationship between the inner and outer side information of the nested loop join embodiment of the target operation 220, may be presented as:

|--Nested Loops(Inner Join, OUTER REFERENCES:
        ([t1].[a]) OPTIMIZED WITH PREFETCH)

|--Batch Sort

| |--Index Scan(OBJECT:([t].[tb] AS[t1]))

|--Clustered Index Seek(OBJECT:([t].[ta] AS [t2]),
        SEEK:([t2].[a]=[t].[a] as [t1].[a]) ORDERED
        FORWARD)

Once the target operation 220 is complete, the output is provided 240 via path 235 to present the query results. In one embodiment, it may be desirable to re-establish any order that may have been upset by the reorder operation 214. In such an instance, the reorder operation 214 increased the efficiency of the query plan execution by minimizing, as much as practicable, I/O accesses. Once accomplished, a restore of the order of the rows may take place to place the results back into the original order 230. In general, the results 240 may go to another database operation that is part of the same plan, a database table, including a temporary table, an application which may process it further or display it, and the like. The results may even be piped into another operation also involving a batch sort.

If such a restoring of order of row results is required after retrieving the relevant database information, then the output of the target operation 220 may be input to a optional restoring order function 230 via path 235. The order-restored row results may then be made available.

In one embodiment, the batch sort query plan 210 switches from a row count operation 212 to a reorder operation 214 based on an assessment of the execution efficiency of the target operation. This efficiency assessment may be made based on the actual versus expected performance of the initially selected target operation. In normal operation, a query optimizer engine may select a query plan that may operate efficiently and a switch to a reorder operation may not be necessary. However, in one embodiment, if the actual count of rows processed while executing a row count operation 212 exceeds a threshold based on the estimate of retrieved rows from the database, then the optional reorder operation 214 may be employed. The estimate of the number of rows on which the threshold for the row count operation 212 is based is made by the query optimizer. The selected plan of performing the target operation without performing the reorder operation 214 was premised upon the accuracy of database statistics, predicate selectivity, cardinality estimation and the calculation of a minimum number of rows, and thus I/O accesses. Once that expectation is exceeded, then the selected query plan has failed to produce a total query result as efficiently as expected. Accordingly, that is the proper time to consider switching to a reorder operation 214 to increase the efficiency of the remaining query execution.

In another embodiment, the switch from a row count operation 212 to a reorder operation 214 may be initiated when the expected retrieved rows (N) is exceeded by the actual retrieved rows (A) by some numerical factor. For example, in one embodiment, the switch may occur under the following conditions:

Switch when A=2N

In this embodiment, the numerical factor is 2. Those of skill in the art will realize that any positive real number may be used as a factor for N in the above switch criteria. In one embodiment, where the factor is zero, the batch sort immediately switches to a reorder operation. In another embodiment, where the factor is a very large number, the reorder seldomly occurs because the query is completed before the batch sort query plan switches to the batch sort mode.

Figure 3:
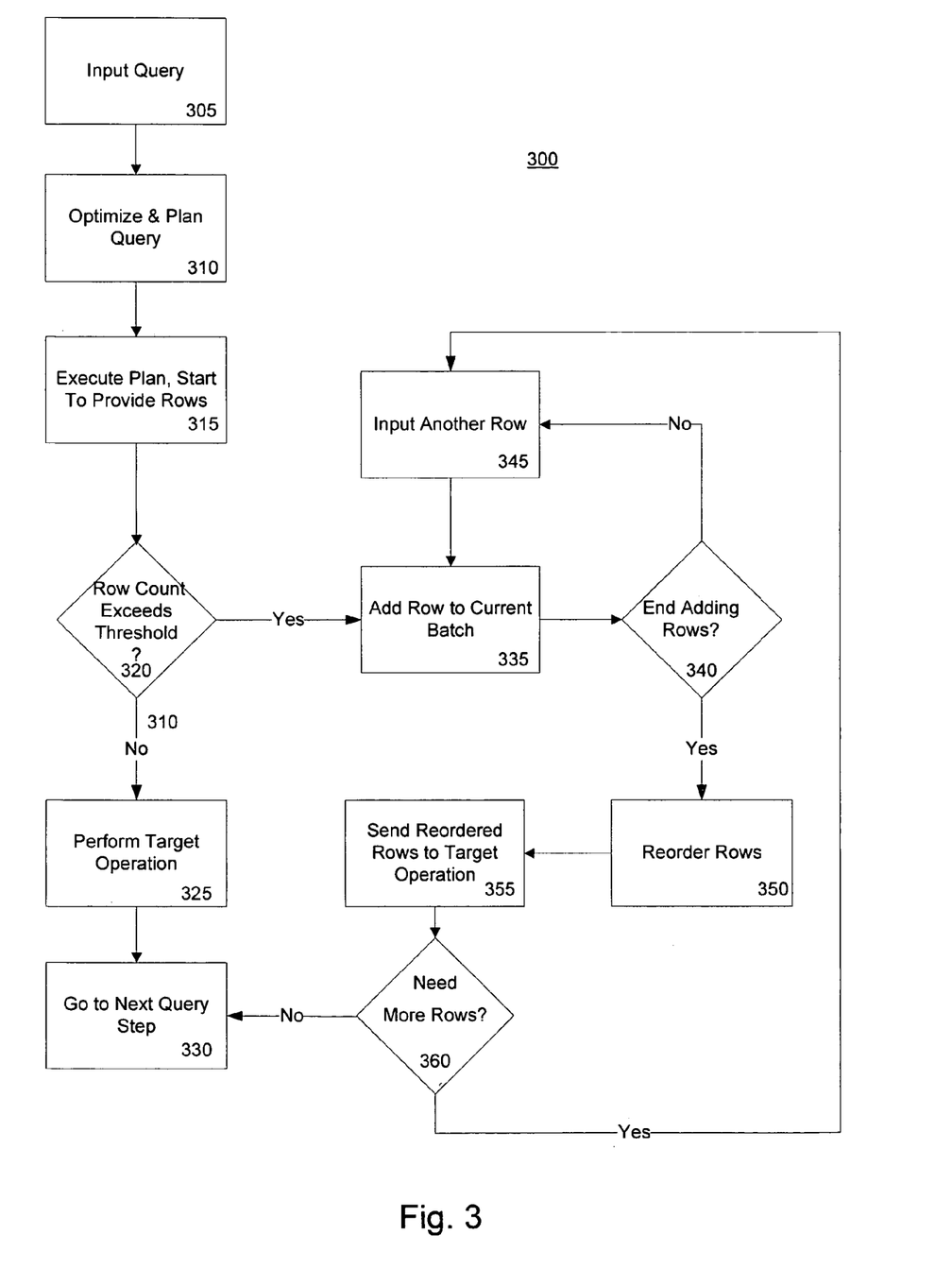
FIG. 3 is a exemplary flow diagram of an embodiment of the invention.

FIG. 3 is a flow diagram of a process 300, of an embodiment of the invention. The process starts by receiving a query statement (step 305). The query statement may be processed by query processor software. This software preferably includes a parser which places the query statement in a form for the query plan engine to consume. The results obtained by processing the query plan are optimized and planned (step 310) as described above where an estimate of the query plan cost is minimized to formulate the "best" approach for satisfying the query statement. Once optimized, a query plan is formulated from the "best" approach discovered by the optimizer. In addition, the query optimizer constructs and integrates a batch sort query plan that includes a reorder operation that serves as an efficiency enhancer if the selected query plan devised by the optimizer becomes inefficient.

Once the batch sort query plan is generated (step 310), the plan may be executed (step 315). During execution, the query proceeds as expected unless it becomes inefficient. In the embodiment of FIG. 3, the query plan starts to deliver rows for processing. The number of rows retrieved is then tested. If the actual number of rows retrieved is less than the estimate of rows to be returned, (step 320), then the process 300 performs the target operation(s) directly against the retrieved rows (step 325). The next query plan step may then be executed (step 330). The process from steps 315 to step 330 represents the embodiment of the invention in the row count mode. Target operations against retrieved rows are row operations and may include such operations as joins, fetches, inserts, updates, deletes, and other such row level operations as are well known in the art.

If the decision at step 320 indicates that the actual number of rows returned is greater than a given threshold (generally some multiple of the query optimizer's cardinality estimate), then the batch sort query plan enters the reorder mode (step 335). Note that this switch to the reorder mode is merely the execution of an alternate step in the same batch sort query plan that is currently being executed. As part of the batch sort reorder mode, a row from execution of the plan is added to the current batch (step 355). In one embodiment, the row is entered into a RAM buffer that will temporarily store the current batch. Next, the determination if more rows need to be added to the current batch is made at step 340. This determination can be made on several factors. Example factors include whether more rows are available, whether a preselected batch size has been reached, or whether the RAM buffer is full. If more rows are needed, then another row is retrieved (step 345) in accord with the query and the row is added to the current batch (step 335).

If the process 300 is finished adding rows (step 340), then the current batch is reordered (step 350). The reorder operation may include any type of reordering operation or series of operations such as a sort, hash partitioning, or other type of reordering operation as is well known in the art. At the end of the reordering operation (step 350), the reordered rows are sent to the target operation (step 355) to continue execution of the query. If no more rows need be processed in the reorder mode (step 360), then the process continues to go to the next query step (step 330) of the query plan. However, if the reorder mode is not finished and more rows need to be processed to satisfy the query (step 360) then reorder mode processing continues, a new batch is started, and more rows are input (step 345) and entered into the new batch (step 335). As noted above, the results from the row count mode operations are not discarded when the target operation becomes inefficient as detected at step 320. The rows processed by the row count mode operations are used in conjunction with the rows processed by the reorder mode operations so as to efficiently satisfy the original query statement of step 305. In one embodiment, any retrieved row is processed only once and no retrieved row is discarded in producing final row results. It should be noted that the process steps of 320 through 330 as described above may be used either once or iteratively as needed by the query plan.

In one embodiment of the invention, the size of the current batch described with respect to FIG. 3 can change from one batch to another. Such changes in batch size may be prompted by changes dictated as part of the query plan or changes dictated as part of a scheme to optimize the batch sort performance based on other factors such as the estimated row retrieval size, the progress being made with respect to more efficiently processing the current batches while in reorder mode, and the size of the available memory used to store the current batch.

In one embodiment of the flow diagram of FIG. 3, the reordering operation is performed entirely in RAM memory to avoid the use of an I/O access to disk. In another embodiment, a restoring of the order of the reordered rows is performed before results are provided. This order restoration is in keeping with the optional operation 230 shown in FIG. 2. The reorder and order restoration operations may also be coordinated such that both may be performed entirely in RAM memory to avoid the time expense of I/O accesses from such slower external memory devices such as disk.

Exemplary Computing Device

Figure 4:
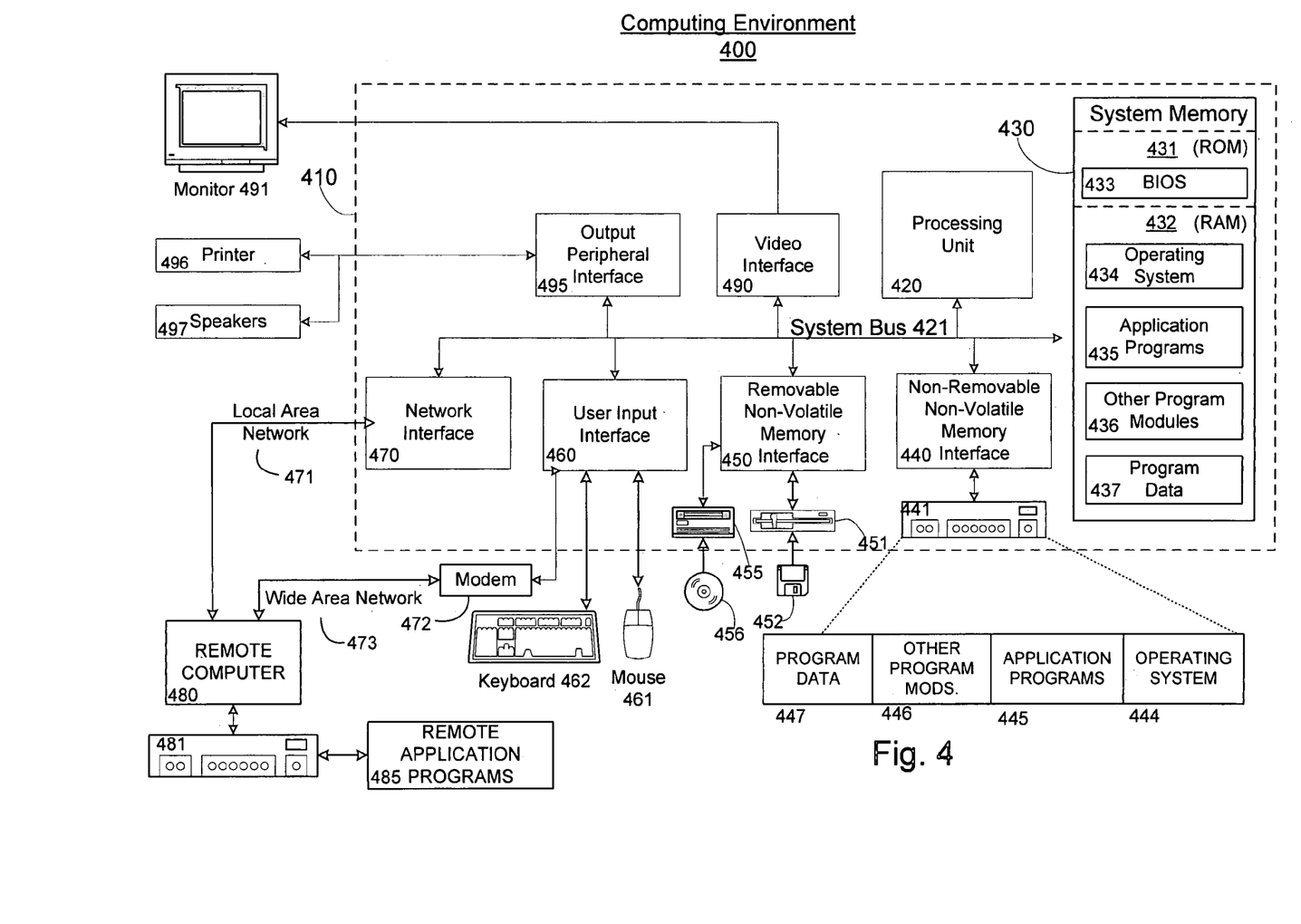
FIG. 4 is a block diagram showing an exemplary computing environment in which aspects of the invention may be implemented.

FIG. 4 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 400 in which the embodiments of the invention may be implemented, although as made clear above, the computing system environment 400 is only one example of a suitable computing environment and is not intended to suggest any limitation as to the scope of use or functionality of an embodiment of the invention. Neither should the computing environment 400 be interpreted as having any dependency or requirement relating to any one or combination of components illustrated in the exemplary operating environment 400.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method to increase the efficiency of a database query Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to query a database, the method comprising:
receiving and optimizing a query against a database;
developing a query plan to retrieve database data, the plan comprising instructions for a row count operation, a corresponding expected number of row retrievals and a conditional row reordering operation for a row batch;
executing the row count operation of the query plan, wherein rows are retrieved from the database and row retrievals are counted;
switching to execution of a conditional row reordering operation comprising consuming, reordering, and returning a subset of remaining input rows retrieved for a row batch only if a quantity of counted row retrievals exceeds the expected number of row retrievals, otherwise not executing the row reordering operation; and
producing database row results for all retrieved database rows, wherein the results comprise data from at least one of the row count operation or the conditional row reordering operation and wherein no retrieved row is processed more than once and no row result is discarded.

2. The method of claim 1, wherein receiving and optimizing a query against a database comprises receiving a query against a database management system supporting one of a relational or non-relational database and optimizing the query using statistics of the database.

3. The method of claim 1, wherein developing a query plan further comprises generating instructions having at least one of an index lookup, a fetch, an insertion, a deletion and an update operation.

4. The method of claim 1, wherein producing database row results comprises executing all steps in the query plan using at least one iteration of the row count operation and the conditional row reordering operation for all retrieved rows.

5. The method of claim 1, wherein executing the conditional row reordering operation further comprises executing the conditional row reordering operation only if the quantity of counted row retrievals exceeds the expected number of row retrievals by a factor ranging from zero to any positive number, otherwise not executing the row reordering operation.

6. The method of claim 1, wherein the conditional row reordering operation occurs entirely in RAM memory.

7. The method of claim 1, further comprising iteratively executing the conditional row reordering operation wherein a quantity of rows consumed by a row reordering operation changes in at least one iteration.

8. The method of claim 7 wherein the quantity of rows consumed changes exponentially.

9. The method of claim 1, wherein a quantity of rows consumed by a conditional row reordering operation changes in accordance with available memory.

10. The method of claim 1, wherein executing the row count operation comprises returning a first N rows without reordering.

11. The method of claim 1 wherein executing a conditional row reordering operation of row batches comprises executing a sort of row batches.

12. The method of claim 1, further comprising an order restoring operation of the retrieved rows after executing the row reordering operation and prior to producing the database row results.

13. The method of claim 12, wherein both the row reordering operation and the order restoring operation occur in RAM memory.

14. A system for querying a database, the system comprising:
a processor having access to memory, the memory having instructions which, when executed, perform a method comprising:
optimizing a database query;
developing a query plan to retrieve database data, the plan comprising instructions for a row count operation and a conditional row reordering operation;

executing the row count operation during retrieval of rows from the database until an efficiency of a target operation falls below a threshold, whereupon the conditional row reordering operation is executed; and producing database row results in response to the query wherein the producing of said database row results comprises combining row retrieval results obtained via execution of the row count operation with row retrieval results from the conditional row reordering operation whereby no retrieved row is processed more than once and the row retrieval results are not discarded;

means for determining the efficiency of the target operation; and a display for viewing the database row results.

15. The system of claim 14, wherein developing a query plan comprises generating instructions having at least one of an index lookup, a fetch, an insertion, a deletion and an update operation.

16. The system of claim 14, wherein means for determining the efficiency of the target operation comprises monitoring a number of actual rows retrieved versus a number of rows expected to be retrieved and executing the conditional row reordering operation only if a quantity of counted row retrievals exceeds the expected number of row retrievals by a factor ranging from zero to any positive number, otherwise not executing the row reordering operation.

17. The system of claim 14, wherein the method further comprises performing a conditional row reordering operation iteratively.

18. The system of claim 17, wherein the step of performing a row reordering operation iteratively comprises changing a size of a number of rows processed during the row reordering operation in at least one iteration.

19. The system of claim 18, wherein the size of the number of rows processed changes exponentially.

20. The system of claim 18, wherein the size changes in accordance with available memory.

21. The system of claim 14, wherein the method further comprises restoring the order of retrieved rows after executing the row reordering operation and prior to producing database row results.

22. A computer-readable storage medium having computer-executable instructions for performing a method to query a database in a computer, the method comprising:

receiving and optimizing a query in a computer against a database;

developing a query plan to retrieve database data, the plan comprising instructions for a row count operation, a corresponding expected number of row retrievals and a conditional row reordering operation for a row batch;

executing the row count operation of the query plan, wherein rows are retrieved from the database and row retrievals are counted;

executing the conditional row reordering operation of a row batch only if the quantity of counted row retrievals exceeds the expected number of row retrievals, otherwise not executing the row reordering operation; and producing database row results for all retrieved rows, wherein the results comprise data from at least one of the row count operation or the conditional row reordering operation wherein the producing of said database row results comprises combining row retrieval results obtained via execution of the row count operation with row retrieval results from the conditional row reordering operation whereby no retrieved row is processed more than once and the row retrieval results are not discarded.

23. The computer-readable storage medium of claim 22, wherein the method step of executing the row reordering operation comprises switching the query plan from the row count operation to the conditional row reordering operation for a row batch only if the quantity of row retrievals exceeds the expected number of row retrievals by a factor ranging from zero to any positive number, otherwise not executing the row reordering operation.

24. The computer-readable storage medium of claim 22, wherein the method further comprises performing a row reordering operation iteratively.

25. The computer-readable storage medium of claim 24, wherein the step of performing a row reorder operation iteratively comprises changing a size of a number of rows processed during a row reordering operation in at least one iteration.

26. The computer-readable storage medium of claim 25, wherein the size of the number of rows processed changes exponentially.

27. The computer-readable storage medium of claim 22, wherein the method steps further comprise restoring the order of the retrieved rows after executing the row reordering operation and prior to producing database row results.

28. A computer-readable storage medium having computer-executable instructions for performing a method to query a database in a computer, the method comprising:

optimizing a database query;

developing a query plan to retrieve database data, the plan comprising instructions for a row count operation and a conditional row reordering operation;

executing the row count operation wherein rows are retrieved from the database until means for determining an efficiency of a target operation indicates a fall below a threshold, whereupon the conditional row reordering operation is executed; and producing database row results in response to the query, wherein the database row results comprise the data from at least one of the row count operation or the conditional row reordering operation wherein the producing of said database row results comprises combining row retrieval results obtained via execution of the row count operation with row retrieval results from the conditional row reordering operation whereby no retrieved row is processed more than once and the row retrieval results are not discarded.

* * * * *